May 4, 1943.   E. C. RANEY   2,318,553
CONTROL APPARATUS
Filed Aug. 3, 1940   4 Sheets-Sheet 1
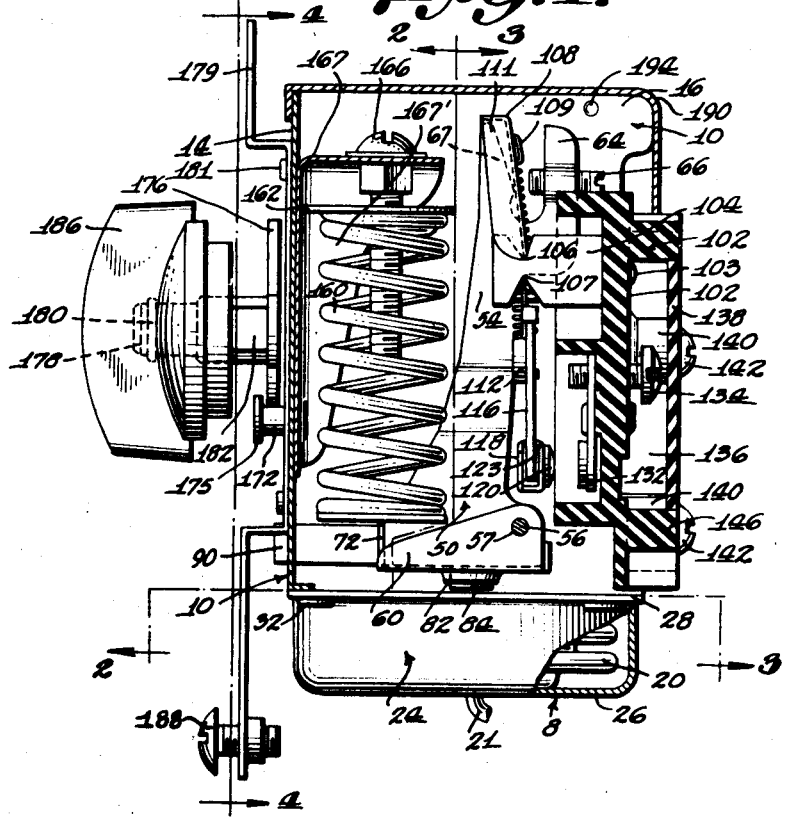
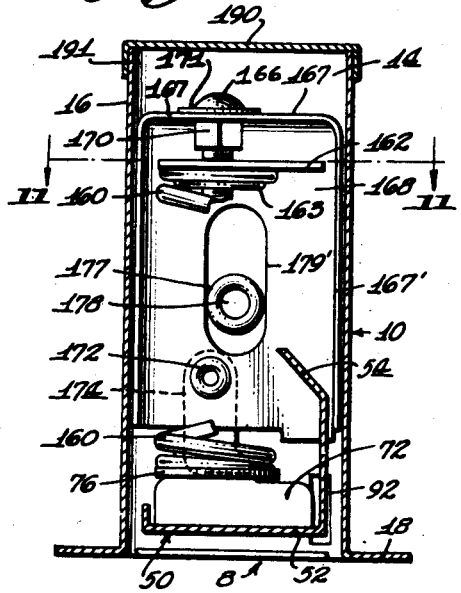
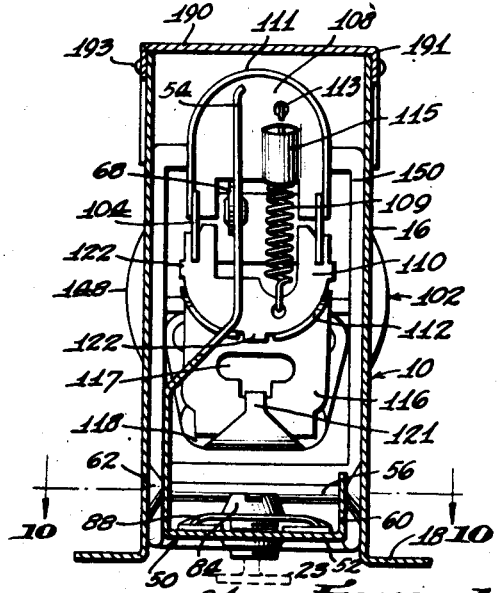
Inventor:
ESTEL C. RANEY
By Warmuth F. Schmieding
Attorney May 4, 1943.   E. C. RANEY   2,318,553
CONTROL APPARATUS
Filed Aug. 3, 1940   4 Sheets-Sheet 2
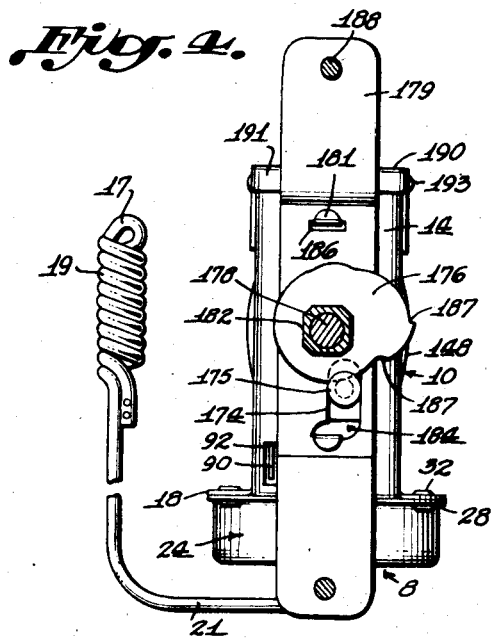
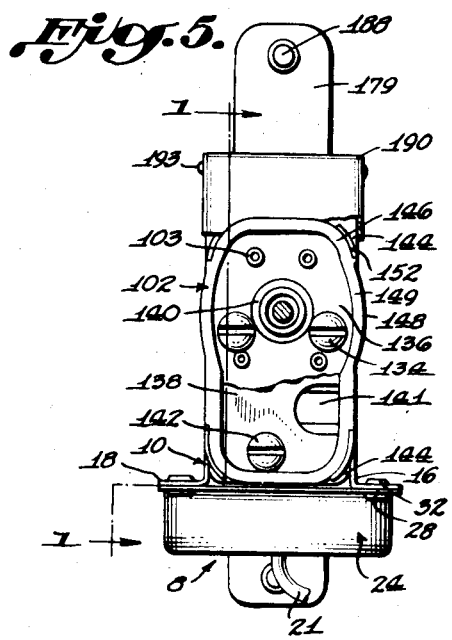
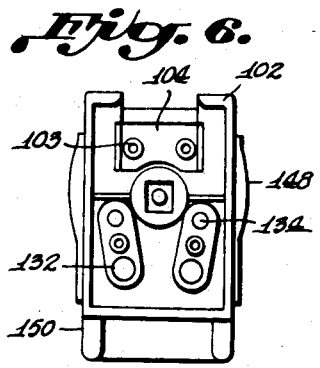
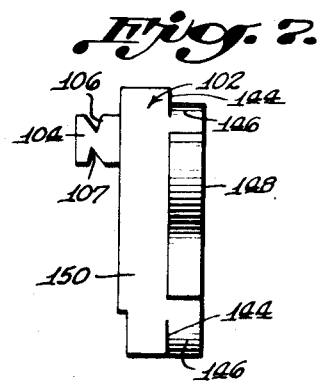
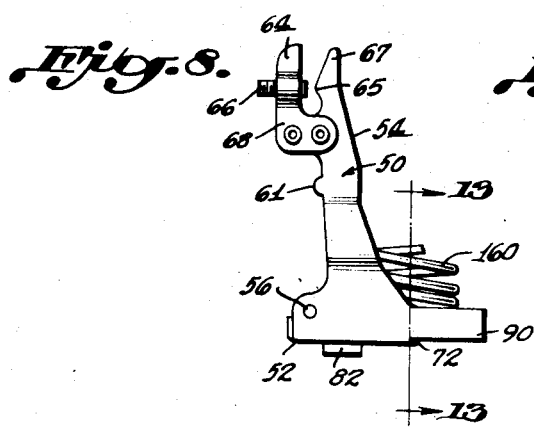
Inventor:
ESTEL C. RANEY
By Warren H. F. Schmieding
Attorney

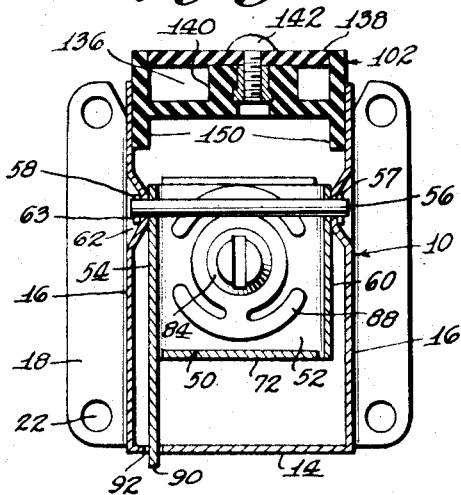
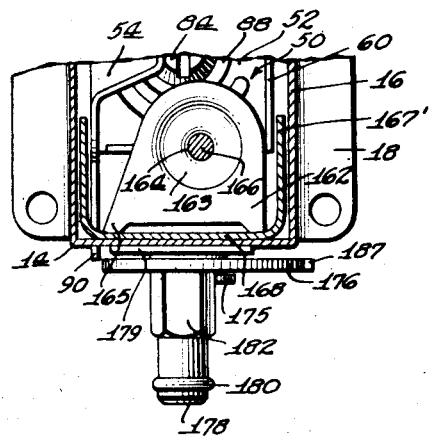
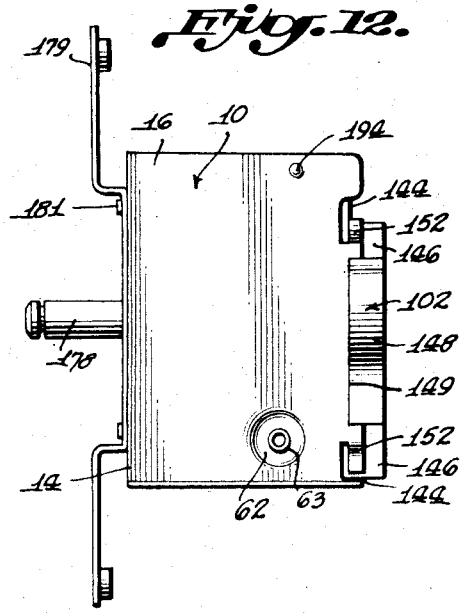
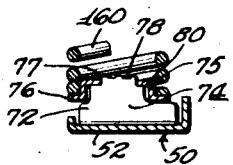

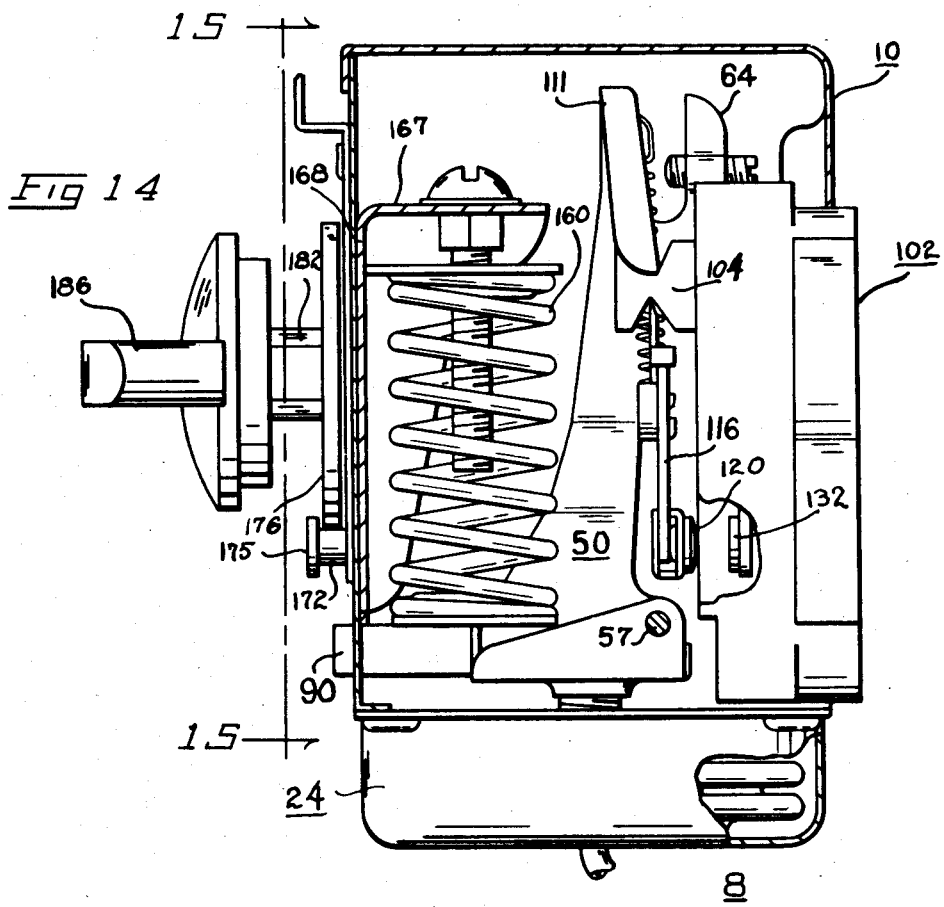
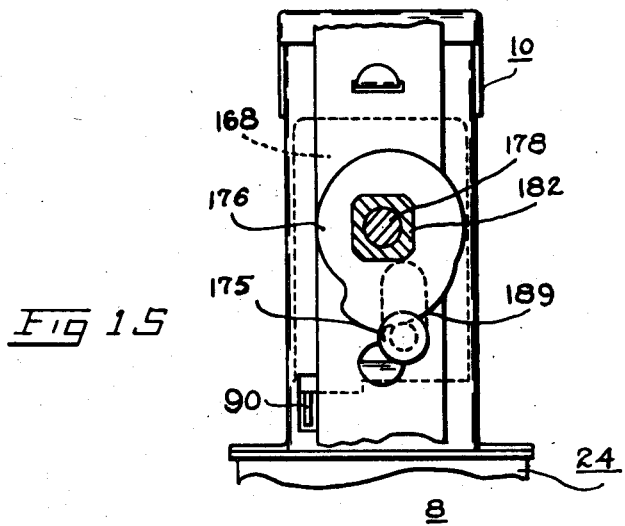

Patented May 4, 1943

2,318,553

UNITED STATES PATENT OFFICE 2,318,553

CONTROL APPARATUS

Estel C. Raney, Columbus, Ohio

Application August 3, 1940, Serial No. 351,009

12 Claims. (Cl. 200—83)

This invention relates to control apparatus, and particularly to temperature control apparatus for household refrigerators. The present application is a continuation in part of my application Serial No. 193,324, filed March 1, 1938, for Control apparatus.

An object of this invention is to provide a control apparatus having a frame comprising three wall portions, and having a power element and a member carrying a switch mechanism each secured as a unit to open sides of the frame, whereby the power element and the switch carrying member form closing walls for the control apparatus and also serve to reenforce the frame walls.

A further object of the invention is to provide a control apparatus having a frame formed with two spaced walls, said two walls being adapted to pivotally support a switch actuating member therebetween, and a power element and a member for supporting a switch member each connected as a unit to an open end of the frame for reenforcing the frame walls, and the switch mechanism being adapted to be operated by the power element through the actuating member.

Another object of the invention is to provide a control apparatus having a spring for controlling the operating characteristics of the apparatus, and adjusting means for the spring comprising an adjusting member slidable parallel with, and guided by, two spaced walls of the control frame, the member having one end connected to the spring and being connected adjacent the other end to a member for causing movement of the adjusting member in a direction of the axis of the spring.

Another object of the invention is to provide a control apparatus having a spring for controlling the operation of the apparatus, and adjusting means comprising an adjusting plate disposed adjacent one wall of the frame of the apparatus and adapted to be translatable parallel to and guided by two other walls of the frame, the plate having one end connected to the spring and a part adjacent the other end of the member extending through the adjacent wall and yieldingly held in engagement with a cam member by the spring tension.

An object of the invention is to provide a manual controller for a control apparatus, consisting of a control member that is movable between two positions by a pressure operated device and a spring opposing the device, which manual controller includes a manually actuated cam and a cam follower, the latter being connected with the spring for adjusting the tension thereof when the follower is moved by the cam and which is engageable with the control member for moving the member to one of its control positions against the action of the pressure device.

A more specific object of the invention is to provide a manual controller for a switch operated by a pressure device in which a spring opposes the pressure device, the controller comprising a manually operated cam and a cam follower that is connected with the spring for varying the tension of the spring to adjust the pressures at which the switch is operated and engageable with the pressure device for causing the switch to be retained in one of its positions, for example the open position, regardless of the pressure of the pressure device.

Other and further objects and advantages will be apparent from the following description, reference being had to the accompanying drawings wherein a preferred form of embodiment of the present invention is clearly shown.

In the drawings:

Fig. 1 is an enlarged view of the control apparatus taken on line 1—1 of Fig. 5;

Fig. 2 is a view of the apparatus taken on line 2—2 of Fig. 1;

Fig. 3 is a view of the apparatus taken on line 3—3 of Fig. 1;

Fig. 4 is a front view of the apparatus taken on line 4—4 of Fig. 1;

Fig. 5 is a rear view of the apparatus;

Fig. 6 is a view of the insulating block showing the fixed contact member and the toggle switch pivoting member mounted on the block;

Fig. 7 is a side view of Fig. 6;

Fig. 8 is a view of the switch actuating member;

Fig. 9 is a partial view of the member shown in Fig. 8;

Fig. 10 is a view taken on line 10—10 of Fig. 3;

Fig. 11 is a partial view taken on line 11—11 of Fig. 2;

Fig. 12 is a side view of the frame member, with the insulating block in position;

Fig. 13 is a view taken on line 13—13 of Fig. 8;

Fig. 14 is a view similar to Fig. 1, but showing the switch opened by the cam, and Fig. 15 is a front view of the apparatus with the switch opened by the cam.

A control apparatus, indicated generally at 8, comprises a frame 10 preferably of a single section of sheet metal formed in a U shape, forming a front wall 14 and side walls 16 for supporting and inclosing the control mechanism. The side walls 16 each have a laterally extending flange 18, which is provided with two openings 22, at either end thereof for connecting a power element 24 to the frame.

The power element 24, in the present form of disclosure, consists of a metal bellows 20 enclosed within a shell 26 and having a closed tube 21 connected thereto. The bellows and tube are filled with a thermal responsive fluid, such as methyl chloride, so that the fluid pressure will cause variations in pressure within the bellows according to the variations of temperatures to which a part of the tube is subjected. A section of the tube 21 adjacent the end thereof is reversed as at 17 and the doubled tube then formed into a closely wound helix as shown at 19.

The helix 19 may then be secured to the evaporator of a refrigerator apparatus by a thermal conducting clamping device (not shown) attached to the evaporator. Such clamping devices are cylindrical in form and tightly embrace the helix so that the temperature of the helix will correspond to the temperature of the evaporator. The helix provides means for presenting a lengthy section of tube for contact with the clamp so that a relatively large volume of the enclosed fluid will be affected by the temperatures in the evaporator. It will be noted that every other convolution of the helix is formed of the reversed section of the tube, thereby reenforcing the helix against axial stress which may be caused by accidental pulling of the tube.

A push rod 23 is connected in the movable end of the bellows 20 and engages a switch actuating member 50 for actuating the switch by the expansion and contraction of the bellows 20, as will be described later. The shell 26 is provided with a flange 28, having squared corners thereon which register with the corners of the flanges 18. Openings are provided adjacent each corner of the flange, which register with the openings 22 in the flanges 18, and the shell 26 is connected to the frame 10 by rivets 32. Thus the power element 24 provides a rigid reenforcing base for maintaining the side walls rigid.

A toggle switch mechanism is mounted on a block 102 preferably formed of a dielectric material, such as Bakelite, and the block is attached to the frame 10 between the side walls 16. The block 102 is formed with two oppositely disposed side walls 150 which are adapted to fit between the side walls 16 of the frame 10, and maintain the walls rigidly spaced from one another. A pair of bosses 148 are formed on the side walls 150 and are adapted to engage the edges of the side walls 16 for locating the block with respect to the edges of the walls. The side walls are formed with ears 152 which, after the block 102 is inserted in position, are turned to conform to the curved corners of walls 146, formed on the insulating block. When the ears 152 are turned, the inside edges engage shoulders 144 formed at each corner of the block 102. Thus the block is locked in engagement with the side walls 16 of the frame 10. The bosses 148 are adapted to engage in a shallow offset 149, formed in the edge of the side walls 16 to prevent movement of the block with respect to the upper and lower edges of the side walls. Thus the insulating block 102, carrying the switch mechanism may be easily and securely attached to the frame, further reenforcing the walls and forming a closing wall for the control apparatus.

A U shaped bracket 104 is secured to the insulating block 102 by rivets 103 extending through the yoke and block. The legs of the U shaped bracket 104 are provided with two pairs of V shaped notches or pivots 106 and 107 for pivoting the ends of a pair of toggle members therein. The pivots 106 are offset with respect to the pivots 107 and are disposed closer to the block 102 for reasons which will appear hereinafter. The moving parts of the switch mechanism comprises two U shaped toggle members 108 and 110, which are preferably formed of sheet metal stampings and reenforced by the upturned edges 111 and 112 respectively. The ends of the legs of each of the members 108 and 110 are adapted to engage in the pivots 106 and 107 respectively, and are yieldingly retained in their respective pivots by a tension spring 109, connected in holes 113 formed in the yoke of the members, and carried between the legs thereof. The ends of the legs of the members are beveled to form knife edged bearings. The yoke of the member 108 has a semi-cylindrical section 115 formed therein for reenforcing the member and to allow space for the spring 109 to move between the legs thereof. The member 110 is adapted to carry an insulating member or strip 116, preferably of fiber, on the free end thereof. The strip 116 is connected to the member 110 by three ears 122, formed on the member 110, two of which are crimped over the side edges of the strip and the third of which extends through an opening in the strip and is crimped over the surface of the strip adjacent the opening. A contact bar 118 is secured on the end of the strip 116 and is adapted to bridge a pair of fixed contacts 132 mounted on the insulating block 102. A T shaped opening 117 is provided in the strip 116 through which a part of the contact bar 118 extends. The contact bar 118 is preferably formed of a copper sheet having the general shape of a triangle, and having a lug 121 formed at the apex and a similar lug 123 formed at the center of the base thereof. The sheet is loosely formed over the end of the member 116 as shown in Fig. 1, and the lug 123 is turned to extend into one end of the opening 117 for holding the contact member 118 in place on the strip. A pair of contacts 120 are riveted to the wide part of the contact member 118, and are spaced to engage the fixed contacts 132 when the switch is closed. The contacts 132 are suitably mounted each on one of a pair of terminal bars 130 riveted to the block. The circuit wires for the device to be controlled may be connected to the terminal members 130, by terminal screws 134 threaded in the terminal members from the opposite side of the insulating block through suitable openings in the block. A chamber 136 is formed in the block 102 by walls 146 for accommodating the wire leads from the circuit. A plate 138, preferably of insulating material, is provided for inclosing the chamber. The plate 138 is secured over the chamber opening by screws 142, which are threaded in a pair of bushings 140, formed integral with the insulating block 102. The bushings 140 serve as supports for the cover. The plate 138 is provided with an opening 141 to admit the line wires to the chamber 136. Thus the switch mechanism may be completely assembled on the insulating block 102, and the block then secured to the walls of the frame, as a unit.

The switch mechanism is adapted to be operated by the power element 24 through the switch actuating member 50. The member 50 is preferably formed of heavy sheet metal and comprises a base 52 and an arm 54 formed integral therewith, and is pivotally supported between the side walls 16 by a pin 56. The pin 56 is tightly pressed in holes 57 and 58, formed in an upturned ear 60 of the base 52 and at the base of the arm 54, respectively, so that the pin 56 is substantially an integral part of the actuating member 50. The length of the pin 56 is such that a relatively short section of the pin will extend beyond either side of the member 50 when the pin is in place. The side walls 16 each have a circular indentation 62, formed therein, each of which is provided with a bearing 63 for receiving an end of the pin 56. The bearings 63 are formed by lancing a circular opening in the indented parts of the wall so that the metal adjacent the opening is extended to present a substantial bearing surface. Thus the ends of the pin 56 may extend through the bearings 63, without extending beyond the plane of the surface of the side walls 16. In the assembly of the control device, the actuating member 50 is secured in position between the walls of the frame 10 prior to the connection of the power element 24 to the frame so that the walls may be spread and the ends of the pin 56 slipped into the bearings 63. When the power element is attached to the frame, the walls are then held rigid, and the pin 56 will be locked in the bearings. The arm 54 is provided with fingers 64 and 67 formed at the end thereof. The fingers are provided with a lug 65 and an engaging screw 66 which engage the toggle member 108 when the switch is operated. The screw 66 is adapted to be held between a member 68, riveted to the arm 54, and the finger 64. The member 68 and the finger 64 are each formed with curved portions 70 and 71 respectively for receiving the adjusting screw 66. The member 68 is preferably formed of resilient material so that the screw 66 will be pressed in the curved sections 70 and 71 for preventing change in the adjustment of the screw. The arm 54 is provided with a lug 61 formed thereon for engaging the switch member 110 for limiting the opening movement of the switch member. The base 52 of the member 50, has one end upturned, as at 72, which is formed with a neck 74 and shoulders 75. A washer 76, having an opening 77 of substantially the same shape as the cross section of the neck 74, is loosely carried on the shoulders 75, and held on the neck 74 by mutilations 78 at the top of the neck. The washer 76 has a circular embossed part 80 for centering a compression spring 160 thereon. A screw 84 having an indented part (not shown) in one end thereof for receiving the end of the thrust rod 23, is threaded in a lanced opening 82, formed in the base 52. The screw 84 is locked in position by a lock washer 88 after it is once adjusted to a proper operating position with respect to the push rod 23. An arm 90, formed on the member 50 extends at substantially right angles with the arm 54, and is adapted to move in a rectangular opening 92, formed in the front wall 14 for limiting the movement of the actuating member 50 within a definite range to prevent distortion of the parts of the control apparatus if the helix 19 should be subjected to warm atmospheric temperatures.

When the block 102 with the toggle switch mechanism assembled thereon is attached to the frame 10, the yoke of the toggle member 108 is first slid between the fingers 64 and 67 of the arm 54 and the block 102 is then secured to the side walls 16 as described above. Thus the actuating member 50 is adapted to engage the member 108 and move it about its pivot to operate the switch, as will be described hereinafter.

The top of the frame is closed, after the block 102 is attached thereto, by a cover 190 having one end of the cover turned at right angles and the end edge of the turned portion shaped to conform with the top side of the block 102 to effectively enclose the switch apparatus in the frame. The cover 190 is formed with turned edges 191, which fit over the ends of the frame walls, and detents 193 are provided in the edges 191, which engage with similar detents 194 formed in the side walls 16 adjacent the top thereof for frictionaly holding the cover on the frame.

The spring 160 is provided for controlling the temperatures at which the switch is operated. One end of the spring 160 is adapted to engage the washer 76, as described above, and thereby transmit a load on the bellows through the member 50. The other end of the spring is engaged by a plate 162, having a circular centering boss 163 and a threaded hole 164 through the center thereof for receiving a screw 166. The plate is formed with a pair of ears 165, which engage the wall of a slide or member 168, to prevent rotation of the plate. The plate is connected to the slide 168 by the screw 166, which is threaded in the hole 164, and supported on a bracket 167 formed on the slide. The bracket 167 is provided with a hole through which the screw 166 is extended and rigidly fixed thereto by a nut 170 and washer 171. Thus the spring 160 may be adjusted at the factory by turning the screw 166 one way or the other to change the distance of the end of the spring 160 from the bracket 167 and establish the proper adjusting range of the control apparatus for the user thereof.

The slide 168 is formed of sheet metal and comprises a wall part having a turned end which comprises the bracket 167. The bracket and wall part are reenforced by web parts 167' formed thereon. A lug 172 is riveted adjacent one end of the wall part of the slide 168 and extends through a slit 174 formed in the wall 14 for engagement with the periphery of a cam 176. The lug is cylindrical in shape and is provided with a flange 175 on the end thereof which engages the outside surface of the cam 176 to hold the adjusting member 168 against the wall 14. The spring 160 yieldingly engages the lug 172 with the periphery of the cam. The width of the slide 168 is such that the sides thereof engage the walls 16 and when the slide is moved by the cam, the walls guide the member in a direction of the axis of the spring 160.

The cam 176 includes a hub 182 formed integral therewith which is adapted to be axially supported on a post 178 secured to the wall 14, such as by extending a hollowed neck part on the post through a hole in the wall 14 and then rolling the neck outwardly and against the wall as indicated at 177. A slot 179' is provided in the wall part of the slide 168 to accommodate the turned part 177 and permit the slide 168 to move against the inside surface of the wall 14. The hub 182 is square in cross section so that a knob 186 provided with a squared recess may be fitted on the hub whereby the cam may be rotated by the knob. Circular grooves are provided adjacent the end of the hub 182 and in the recess in the cap, so that a split ring spring 180 may be interposed between the two grooves and thereby hold the knob on the shaft.

When the cam 176 is rotated by the knob, the periphery thereof is in engagement with the lug 172, and translates the slide 168 in a direction of the axis of the spring 160. The cam 176 is provided with detents 187 on the periphery thereof which are adapted to engage the lug 172 and limit the rotation of the cam member in either direction. Thus when it is desirable to increase the pressures or temperatures at which the switch is operated the cam is rotated counterclockwise, as viewed in Fig. 4, which moves the slide 168 downwardly thereby compressing the spring 160, to increase the load upon the bellows. When it is desired to decrease the pressures or temperatures at which the switch operates, the cam is rotated clockwise which permits the spring 160 to raise the slide 168 upwardly and decrease the tension of the spring 160.

It is desirable to provide means for opening the switch manually to terminate operation of the refrigerating apparatus, and I have provided means for opening the switch by manipulating the adjusting knob 186. The cam 176 is formed with a rise 189, adjacent one of the detents 187, which rise moves the slide 168 against the arm 90, when the cam is rotated to its limit in a counterclockwise direction, and rotates the member 50 against the pressure in the power element 24 and causes opening of the switch. This is illustrated clearly in Figs. 14 and 15. The cam, acting through the slide 168, maintains the member 50 in the switch open position regardless of the pressure in the power element.

Assuming that the control apparatus is to be operated in the circuit of the refrigerating system, the operation is as follows: When the bulb 19, which is responsive to the chilled part of the refrigerating system, becomes warmed the gas therein causes expansion of the bellows 20 to rotate the member 50 clockwise, as viewed in Fig. 1. The finger 64 is in engagement with the member 108 and the lug 61 is in engagement with the member 110, and those two members are moved to the right and about their pivots 106 and 107. The pivots 106 and 107 are offset from one another as described above, so that the center of the spring 109 will pass to the right of the pivot 107 prior to passing to the right of pivot 106, and in so doing will cause the member 110 to be snapped to the switch closing position, which causes the spring 109 to pass to the right of pivot 106 and snap the member 108 against the screw 66. The refrigerating apparatus is thus energized and the coil 19 will then be cooled and cause the gas pressure in the bellows 20 to decrease. The spring 160 will then cause the member 50 to be rotated counterclockwise and the finger 67 will move the member 108 and the spring 109 to the left of the pivot 106 and cause the member 108 to be snapped to the lug 65. The spring 109 is then carried to the left of the pivot 107 and snaps the member 110 against the stop 61 on the arm 54 to open the switch and deenergize the refrigerating apparatus.

The control apparatus may be attached to the refrigerator by a sheet metal bracket 107 secured to the frame wall 14. The bracket 179 is secured to the wall by ears 181, formed on the wall 14, which extend through openings 174 and 186 in the bracket member 179 and are crimped over the edges of the opening. The opening 174 has an elongated part 184 for permitting movement of the lug 172 therein when the control apparatus is adjusted. The bracket 179 is also provided with an opening, not shown, through which the post 178 extends. Holes are provided adjacent either end of the bracket 179 through which suitable bolts 188 may extend for securing the bracket to any convenient mounting frame, such as for example, the baffle plate on an electric refrigerator.

While the form of embodiment of the present invention as herein disclosed constitutes a preferred form, it is to be understood that other forms might be adopted, all coming within the scope of the claims which follow.

I claim:

1. In a control apparatus, a frame having three walls, two of said walls being oppositely disposed from one another; control means and actuating means therefor attached to said two walls; resilient means for affecting operation of the control means; a member connected to the resilient means; and means supported on one of said walls for moving the member parallel to the other two walls for adjusting the resilient means, said member having a surface thereof adjacent said one wall and having edges adjacent the said two walls and guided thereby when the member is moved.

2. In a control apparatus, a housing; a power element mounted on said housing, a unitary switch assembly including a base having a fixed contact, a cooperating movable contact and toggle mechanism for actuating the movable contact, said contacts and toggle mechanism being disposed in said housing, said unitary switch assembly being removably carried by the housing; and a lever pivotally mounted in said housing, said lever and toggle mechanism having elements that are intermeshed with one another when the switch assembly is secured in position in said housing, for actuating the toggle mechanism in opposite directions.

3. In a control apparatus, a housing; a power element carried thereby; a base; fixed and cooperating movable contacts; toggle mechanism for actuating the movable contact, said base, contacts and toggle mechanism forming a unitary assembly removably carried by the housing with the contacts and toggle mechanism within the housing; mechanism actuated by the power element, one of said mechanisms having a plurality of fingers and the other having an element insertable between the fingers when the toggle mechanism is inserted in the housing for transmitting movement from the second mentioned mechanism to the first.

4. A control apparatus comprising a housing including a sheet metal U shaped frame having a yoke wall and walls extending outwardly therefrom, a wall member bridging the end edges of the outwardly extending walls opposite the yoke wall, said wall member having shoulders facing the yoke wall and abutting the end edges of the outwardly extending walls and having shoulders facing in the opposite direction, ears on and adjacent the end edges of the extending walls, said ears being bent to abut said last mentioned shoulders, a wall member extending outwardly from the yoke wall and secured to one side edge of each of the extending walls, a cover extending outwardly from the yoke wall, said cover having flanged edges for receiving therebetween the opposite side edges of the extending walls; switch actuating mechanism disposed within the housing and carried by one of said members; and a power element connected with the switch actuating mechanism and carried by the other of said members.

5. A control apparatus comprising a housing including a U shaped frame having a yoke wall and walls extending outwardly therefrom, a wall member secured to and bridging the end edges of the outwardly extending walls opposite the yoke wall, and a wall member extending outwardly from the yoke wall and secured to one side edge of each of the extending walls; switch actuating mechanism disposed within the housing and carried by one of said members; a power element connected with the switch actuating mechanism and carried by the other of said members; a loading spring within the housing for opposing movement of the power element; and mechanism associated with the spring and extending through the yoke wall for adjusting the tension of the spring.

6. In a control apparatus, a housing including a pair of spaced sheet metal walls, means connected between certain edges of said walls and forming another wall of the housing; switch mechanism within the housing; a base for the switch mechanism forming an outer wall for the housing, said base having inwardly facing shoulders abutting other edges of the sheet metal walls and having outwardly facing shoulders, said sheet metal walls having ears adjacent the latter mentioned edges thereof, said ears being bent to abut the outwardly facing shoulders on said base for retaining the inwardly facing shoulders in engagement with said other edges.

7. In a control apparatus, a housing including a U shaped sheet metal member forming opposed walls and a wall interconnecting the opposed walls; control mechanism and actuating means therefor disposed within the housing; a spring for affecting operation of the control mechanism; a slidable member for adjusting the tension of the spring, said slidable member being disposed within the housing and having opposite edges thereof lying adjacent the inner surfaces of said opposed walls and guided by the latter walls and having one surface thereof frictionally engaging the interconnecting wall; and means for adjustably moving the slidable member along the interconnecting wall.

8. In a control apparatus, a frame having three walls, two of said walls being oppositely disposed from one another; control means and actuating means therefor attached to said two walls; resilient means for affecting operation of the control means; a member connected to the resilient means; and means supported on one of said walls for moving the member parallel to the other two walls for adjusting the resilient means, said member having a surface thereof adjacent said one wall and having edges adjacent the said two walls whereby the two walls guide the member when the member is moved, said member having a part for engaging and moving one of the first two mentioned means during a portion of the movement of the member for positively maintaining the control means in one of its control positions.

9. In a control apparatus, a frame having three walls, two of said walls being oppositely disposed from one another; control means and actuating means therefor attached to said two walls; resilient means for affecting operation of the control means; a member connected to the resilient means; and means supported on one of said walls for moving the member parallel to the other two walls for adjusting the resilient means, said member having a surface thereof adjacent said one wall and having edges adjacent the said two walls whereby the member is guided by the walls when the member is moved, said member having a part for engaging said actuating member during a portion of the movement of the member.

10. A controller comprising in combination, a control mechanism; a pressure responsive member for actuating the control mechanism; a spring for resisting movement of the pressure responsive member; a cam; and a cam follower, said follower being connected with the spring and movable by the cam to adjust the tension of the spring, said follower being adapted to be pressed against said pressure responsive member by the cam for causing the control mechanism to be maintained in one of its control positions.

11. A controller comprising in combination a control mechanism; a pressure responsive member for actuating the control mechanism; a spring for affecting operation of the pressure responsive member; a casing for housing said member, said casing including a wall having an opening therein; said member having a part extending in the opening, said part being engageable with an edge of the opening for limiting movement of said member in one direction; a cam; a cam follower, said follower being connected with the spring and movable by the cam to adjust the tension of the spring, said follower being engageable with said part for maintaining said pressure responsive member in a predetermined position.

12. A controller comprising in combination, a control mechanism; a pressure operated member for actuating the control mechanism; a spring for affecting operation of the pressure operated member; a casing for housing said member, said casing including a wall having an opening therein, said member having a part extending in the opening, said part being engageable with an edge of the opening for limiting movement of said member; a cam; a cam follower movable along said wall and in the direction of the opening, said follower being connected with the spring and movable by the cam to adjust the tension of the spring, said follower being engageable with said part for maintaining said member in a predetermined position.

ESTEL C. RANEY.